Feb. 12, 1924.
J. P. H. KROON
1,483,456
CRACKING DEVICE
Filed April 22, 1922
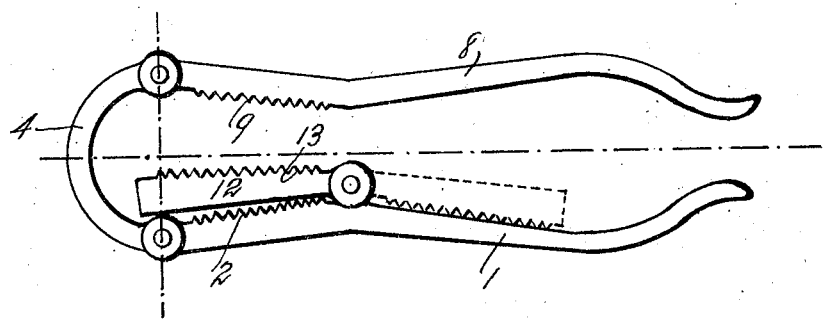
Inventor
Jacobus Piet Henri Kroon,
By Emil Bonnelycke, Attorney Patented Feb. 12, 1924.

1,483,456

UNITED STATES PATENT OFFICE.

JACOBUS PIET HENRI KROON, OF AMSTERDAM, NETHERLANDS.

CRACKING DEVICE.

Application filed April 22, 1922. Serial No. 556,010.

*To all whom it may concern:*

Be it known that I, JACOBUS PIET HENRI KROON, a citizen of Netherlands, residing at Amsterdam, Netherlands, have invented certain new and useful Improvements in Cracking Devices, of which the following is a specification.

The cracking devices as at present in use have the drawback that the points at which the nut or other article to be cracked is gripped and cracked, do not lie below the fulcra of the levers, so that the leverage is consequently only partly utilized. The two handles or levers must, therefore, be pressed together with considerable force, with the result that the action is very sudden. After the shell has been cracked, the pressure upon the handles cannot be instantly discontinued so that the kernel also is consequently cracked or crushed.

These drawbacks are avoided in the cracking device according to the present invention, which is so constructed that a smaller pressure per unit of the surface of the shell need be exerted, whereby any crushing of the kernel may be obviated. This result is attained by shaping the parts between which the nut or other article is gripped in such a manner as to bring the points of cracking or gripping into close proximity to the fulcra of the handles of the device when cracking both large and small nuts or other articles. The device is further constructed in such a way as to enable the gap between the jaws to be changed as regards width, that is in a transverse direction.

An embodiment of the invention is illustrated in the accompanying drawing, the single figure of which is a side elevation of the improved cracking device.

As shown in said drawing, the device comprises two handles 1 and 8 which are connected at their inner ends by a coupling member 4, to the ends of which the handles are separately pivoted; said handles being provided adjacent their aforesaid inner ends with coacting gripping surfaces 2 and 9. The coupling member 4 is bowed outwardly—i. e., away from the handles in the direction of the longitudinal axis of the device—to an extent such that the nut or other article to be cracked may be brought so far between the coacting gripping surfaces that its point projects appreciably beyond an imaginary straight line connecting the centres of pivotal movement of the handles. Hence, the distance between the points on the gripping surfaces which directly engage the nut and the said centres of pivotal movement of the handles is substantially reduced.

In addition to the above parts, the device further includes an auxiliary jaw or member 12 which is pivoted at one end to the central portion of one of the handles (in this instance, the handle 1) and is provided along one of its longitudinal edges with a gripping surface 13. This jaw or member is utilized in cracking small nuts or the like, and it is movable between an operative position (shown in full lines) in which its gripping surface 13 will coact with the gripping surface 9 on handle 8, and an inoperative position in which its gripping surface rests against lever 1, as indicated in dotted lines. In its first-named position, it projects at its free end into the confines of the bowed coupling member.

I claim as my invention:—

1. A cracking device, comprising two coordinate, relatively movable handles having coacting gripping surfaces, a coupling member connecting said handles and to the ends of which the handles are separately pivoted at their inner ends; said coupling member being bowed outwardly, away from the handles in the direction of the longitudinal axis of the cracking device, to an extent such that the article to be cracked may be brought so far between the coacting gripping surfaces that its point projects beyond an imaginary straight line connecting the centres of pivotal movement of said handles, and an auxiliary member pivoted to one handle and provided at one side with a gripping surface; said auxiliary member being movable between an inoperative position and an operative position in which its gripping surface is adapted to coact with the gripping surface on the other handle.

2. A cracking device, according to claim 1, in which the auxiliary gripping member takes the form of an arm pivoted at one end to its carrier handle and adapted to swing backwardly to rest against that handle when in inoperative position, said arm having a length such that its free end projects into said bowed coupling member when in operative position.

In testimony whereof I affix my signature.

JACOBUS PIET HENRI KROON.